United States Patent [19]

Ishibashi et al.

[11] Patent Number: 5,735,599
[45] Date of Patent: Apr. 7, 1998

[54] SCREW FOR MOLDING MACHINE THAT PREVENTS A WRAPPING PHENOMENON

[75] Inventors: Junya Ishibashi, Numazu; Yoshiharu Uchida, Tagata-gun; Masao Toshida, Numazu; Kazuhiro Asai, Fuji, all of Japan

[73] Assignee: Toshiba Kikai Kabushiki Kaisha, Tokyo-to, Japan

[21] Appl. No.: 683,726

[22] Filed: Jul. 18, 1996

[30] Foreign Application Priority Data

Jul. 18, 1995 [JP] Japan .................. 7-181535

[51] Int. Cl.$^6$ ............................................. B29B 7/42
[52] U.S. Cl. ...................................... 366/82; 366/89
[58] Field of Search .......................... 366/75, 79, 80, 366/81, 82, 88, 89, 90, 319, 322, 323, 324; 425/203, 208, 209

[56] References Cited

U.S. PATENT DOCUMENTS

| | | | |
|---|---|---|---|
| 2,607,077 | 8/1952 | Dulmage | 366/82 |
| 3,762,693 | 10/1973 | DeBoo et al. | 366/81 |
| 4,181,647 | 1/1980 | Beach | 366/81 X |
| 4,652,138 | 3/1987 | Inoue et al. | 366/89 |
| 4,729,666 | 3/1988 | Takubo | 428/208 X |
| 5,017,015 | 5/1991 | Schlumpf et al. | 366/82 |
| 5,234,656 | 8/1993 | Kniss | 425/208 X |

FOREIGN PATENT DOCUMENTS 43-24493  10/1968  Japan .

OTHER PUBLICATIONS

Partial Copy of Japanese Magazine "Extrusion", published Nov. 10, 1963 (first), Feb. 15, 1983 (sixth), pp. 147–155 and 169–172.

*Primary Examiner*—Charles E. Cooley
*Attorney, Agent, or Firm*—Cushman Darby & Cushman IP Group of Pillsbury Madison & Sutro LLP

[57] ABSTRACT

A screw for a molding machine comprises a feed zone, a compression zone and a metering zone. The metering zone 12 is provided with a screw element having an intermediate mixing element 12b and a forward end mixing element 12a, and the upstream side of the intermediate mixing element is composed of a deep flight channel screw, and the downstream side of the intermediate mixing element is composed of a shallow flight channel screw.

2 Claims, 8 Drawing Sheets

SCREW FOR MOLDING MACHINE THAT PREVENTS A WRAPPING PHENOMENON

FIELD OF THE INVENTION

This invention relates to a screw for use in a single screw extruder and/or an injection molding machine for molding products made of thermoplastic resin or the like.

BACKGROUND OF THE INVENTION

In order to perform the forming of products from a plastic material, two types of molding machines are generally used, i.e., one being the extruder in which a plastic material is mixed and kneaded while being melted, and extruded to a die to form the products, and the other being the injection molding machine in which the above-described melted plastic material is injected into the molds to form the products.

FIG. 6 is a view showing the construction of the above-described extrusion molding machine, in which a barrel 3 provided at one end thereof with a hopper 2 is supported on a bed 1, and a screw 4 is coaxially inserted into the barrel 3, which is further provided at the forward end thereof with a die 5. Moreover, the above-described barrel 3 is provided with a vent port 6 halfway along the barrel 3.

In operation, a plastic material is fed into the hopper 2 and the screw 4 is driven by way of a reduction mechanism 8 by a motor 7, thus the fed material is transferred forwardly by the rotating screw 4 and gradually heated from the barrel side, melted and mixed and kneaded successively. When the melted material reaches the position of the vent port 6, a drop in pressure occurs temporarily and a gas-like volatile matter contained in the material is discharged and, thereafter, the melted material is further mixed and kneaded and subjected to a pressure successively until it is passed through the die 5, thereby forming the products.

Namely, in the interior of the above-described barrel 3, there is formed a feed zone 10, a compression zone 11, a first metering zone 12, a vent section 13, a second compression zone 14 and a second metering zone 15, in this order, longitudinally from the position where the hopper 2 is provided.

Hereupon, the form of the screw is important to improve the mixing and kneading performance, and, for the most basic form of the screw, a so-called full flighted screw in which the flight extends helically from the beginning to the final end of the screw in a constant pitch is used. Further, in order to improve the mixing and kneading performance, a mixing element, in the form of a Dulmage type screw shown in FIG. 7 or a Unimelt type screw, is utilized in the metering zone. The Unimelt-type screw has stripe-like grooves 9 on the outer peripheral surface of the plunger which do not extend to both ends thereof and which are impassable at one end thereof. The stripe-like grooves 9 are arranged to extend alternately in opposite directions so as not to communicate with each other, as shown on the forward end of the screw 4 in FIG. 8.

The Dulmage type screw 4 shown in FIG. 7 was developed by Dow Chemical company and has grooves inclined with respect to the axis and formed over the entire peripheral area. This Dulmage type screw has a known advantage of the mixing and kneading effects being able to be enhanced without increasing the temperature and the pressure, and of the fluctuation in extrusion being able to be suppressed.

Moreover, the Unimelt type screw 4 shown in FIG. 8 has a superior advantage of improving the dispersion and mixing of resin and preventing a drop in the extrusion capacity, as described, for example, in Japanese Patent Koukoku No. 24493/1968.

FIG. 9 is a view showing the construction of a conventional screw for the above-described molding machine, which comprises, successively from a feed zone 10 adjacent the hopper 2, a compression zone 11, a first metering zone 12, a vent section 13, a second compression zone 14, and a second metering zone 15, and in which the first and second metering zones 12, 15 are provided at the forward ends thereof with forward end-mixing elements 12a, 15a each having the Unimelt type screw.

However, in such conventional screws, in the case of a larger quantity of extrusion or in the case where raw materials having different melting points or a blend of raw materials composed of a virgin raw material and ground pieces are extruded, the raw material having a lower melting point is melted earlier and becomes wrapped around the raw material having a high melting point in the supply part and the compression part, thereby causing a break-up phenomenon of the interiors of the grooves being blocked with solids. Thus, such wrapping phenomenon causes the plasticization of the raw material having a high melting point to be delayed, and this delayed raw material becomes a kernel of a fish eye as an unmelted matter and is extruded. Therefore, it is necessary to apply a high shearing force to such a minute unmelted matter to cause the same to melt and, thus, there are problems in that an increase in the velocity of the screw causes a rise in the temperature of resin, a reduction in a quantity of extrusion, an increase in the load placed on the motor and the like.

SUMMARY OF THE INVENTION

An object of the invention is to provide a screw for a single screw extruder and/or an injection molding machine which breaks the wrapping phenomenon occurring in the supply part and compression part of the screw and subdivides the matter to thereby promote the melting in the metering zone, supply it to the mixing section with a proper viscosity and bring the grinding-down effect in the mixing section effectively into action.

In order to achieve the above-described object, according to the present invention, there is provided a screw for a single screw extruder and/or an injection molding machine, which comprises:

a feed zone; one or more compression zones; and one or more metering zones provided with a screw element, said screw element including an intermediate mixing element and a forward end mixing element disposed downstream of the intermediate mixing element at a distance therefrom, upstream of the intermediate mixing element is a deep flight channel screw, and downstream of the intermediate mixing element is a shallow flight channel screw having a channel depth shallower than the channel depth of the deep flight channel screw. Accordingly, the upstream side of the intermediate mixing element is small in a ratio of compression, the beginning of the melting of resin having a low melting point is delayed, and so occurrence of the wrapping phenomenon is reduced and, simultaneously, the shallow-groove type flight screw zone on the downstream side accelerates the melting of resin, and the melted resin with a proper viscosity is supplied to the forward end mixing element.

BRIEF DESCRIPTION OF THE DRAWINGS

Other objects and aspects of the invention will become apparent from the following description of an embodiment with reference to the accompanying drawings in which.

PREFERRED EMBODIMENT OF THE INVENTION

Now, an embodiment of the invention will be explained with reference to the accompanying drawings.

Figure 1:
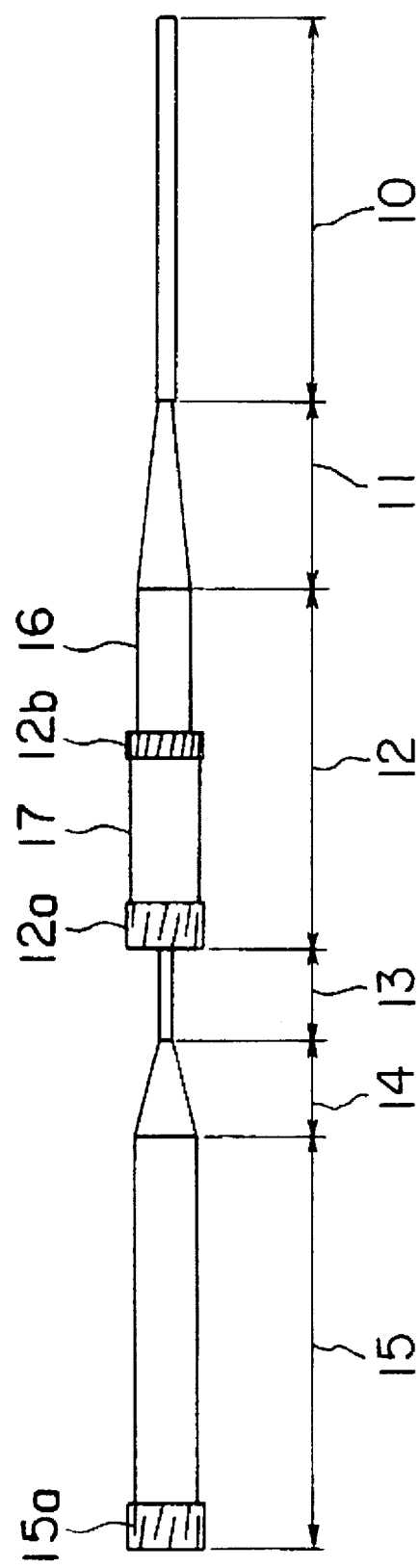
FIG. 1 is a view for explaining the construction of a screw for a single screw extruder according to the present invention.
Figure 8:
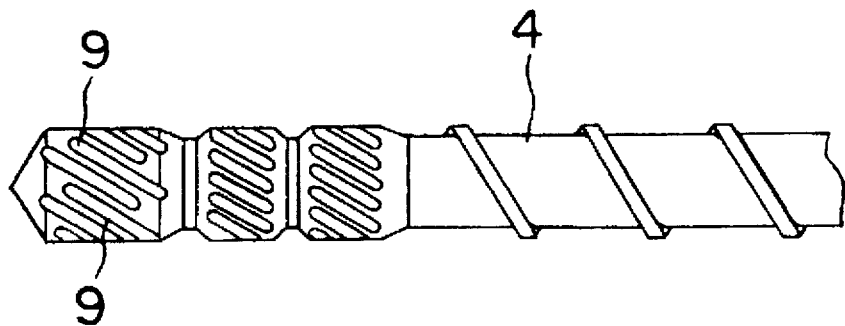
FIG. 8 is a side view of a Unimelt type screw.
Figure 9:
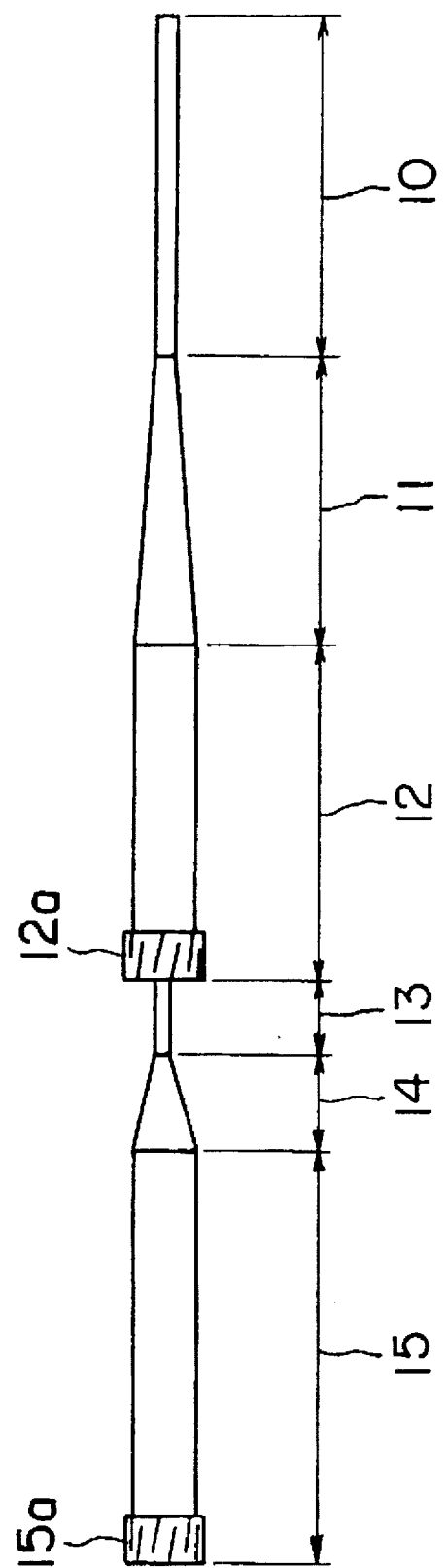
FIG. 9 is a view showing the construction of a conventional screw for a single screw extruder.

FIG. 1 is a view showing the construction of a screw in a vent-type extruder, which comprises, successively beginning from the portion adjacent a hopper, a feed zone 10, a compression zone 11, a first metering zone 12, a vent section 13, a second compression zone 14 and a second metering zone 15. The first metering zone 12 and the second metering zone 15 are provided at each of the forward end portions (at the side of a downstream end) with a screw element having forward end mixing elements 12a, 15a composed of Unimelt type screws shown in FIG. 8.

Figure 7:
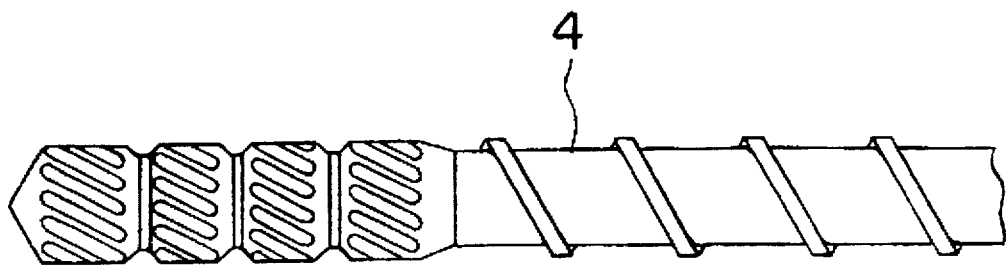
FIG. 7 is a side view of a Dulmage type screw.

At the middle portion of the screw element in the above-described first metering zone 12 at a distance in the upstream side of the above-described forward end mixing element 12a is further provided an intermediate mixing element 12b of the Dulmage type screw shown in FIG. 7. Upstream of the intermediate mixing element 12b is a deep flight channel screw 16, and downstream of the above-described intermediate mixing element 12b is a shallow flight channel screw 17 which has a channel depth shallower than the channel depth of the above-described deep flight screw 16.

In operation, the material fed into the barrel of the extruder is transferred forwardly by way of the feed zone 10 and the compression zone 11 by the rotating screw, and gradually heated from the barrel side and melted while it is transferred to the first metering zone 12. Thereafter, the melted resin is subdivided in the intermediate mixing element 12b, and further acceleration of the melting is performed in the shallow flight channel screw 17 until the melted resin comes to have a proper viscosity. Then, it is fed to the forward end mixing element 12a and extruded from the die by way of the vent section 13, second compression zone 14 and second metering zone 15.

Namely, since in the deep flight channel screw upstream of the intermediate mixing element 12b the screw has a deep channel depth and small ratio of compression, the beginning of the melting of the resin having a low melting point on the upstream side in question is delayed to thereby bring about a reduction in the occurrence of the wrapping phenomenon, thereby enabling the subdivision in the intermediate mixing element to be easily performed. In the meantime, since in the shallow flight channel screw downstream of the intermediate mixing element 12b the screw is shallower in channel depth as described above, acceleration of the melting of the material is performed, and so the melted resin comes to have a proper viscosity and is introduced into the forward end mixing element 12a.

The results of an experiment comparing the conventional screw with the screw according to the invention are shown below:

| Single screw extruder | SE-90DV ($\phi$90 mm, L/D = 32, vent-type) | | | |
|---|---|---|---|---|
| Raw material used | Transparent HI-PS (mixed with 30% ground pieces) | | | |
| Die used | TDS-1000 (lip width 1000 mm) | | | |
| Thickness of sheet | 0.5 mm | | | |
| Performance of extrusion | Screw speed | Throughput rate | Resin temperature at die outlet | Fish eye |
| Conventional | 90 rpm | 190 kg/H | 220 degrees C. | Existence |
| Invention | 90 rpm | 240 kg/H | 215 degrees C. | Small |

The results of measurement of the behavior of resin pressure within the barrel at that time are shown in FIGS. 2 to 5.

Figure 2:
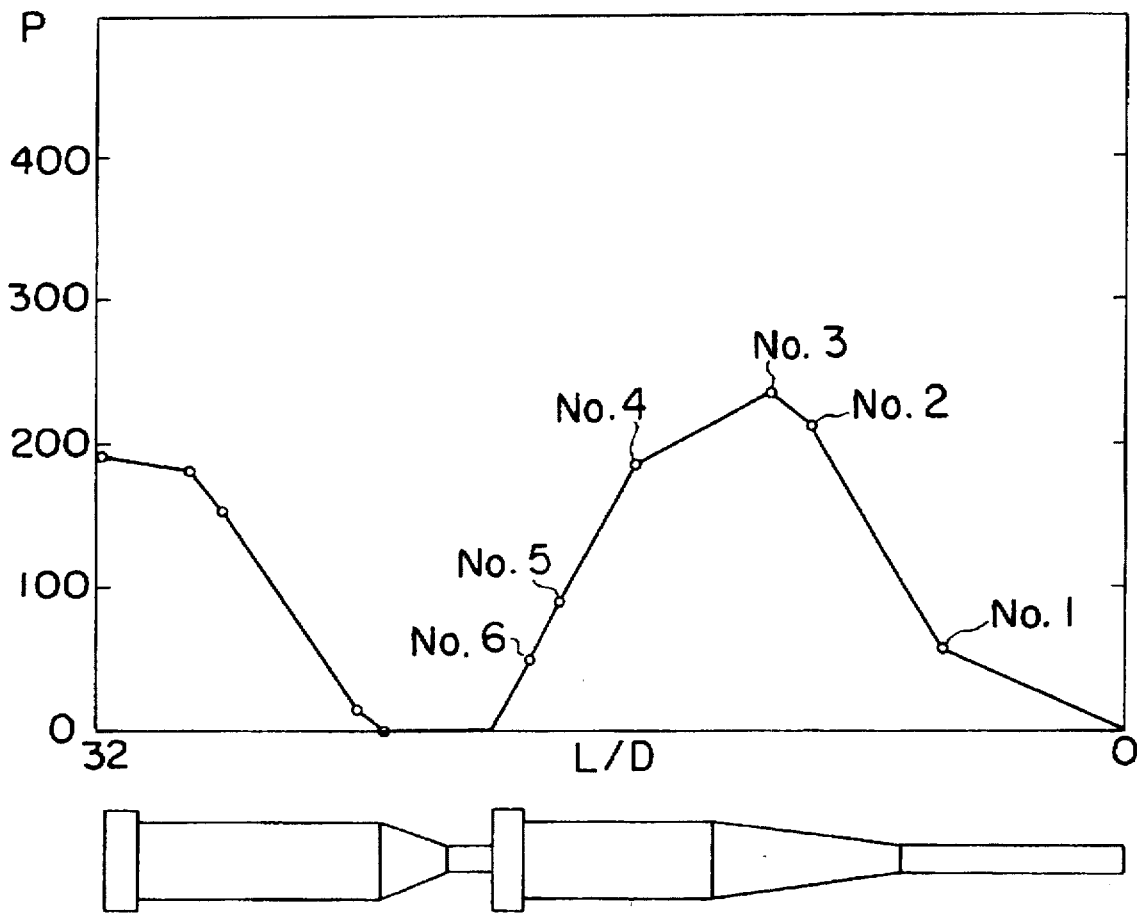
FIG. 2 is a diagram showing the detected values of pressure at each zone within the barrel of a conventional screw.
Figure 3:
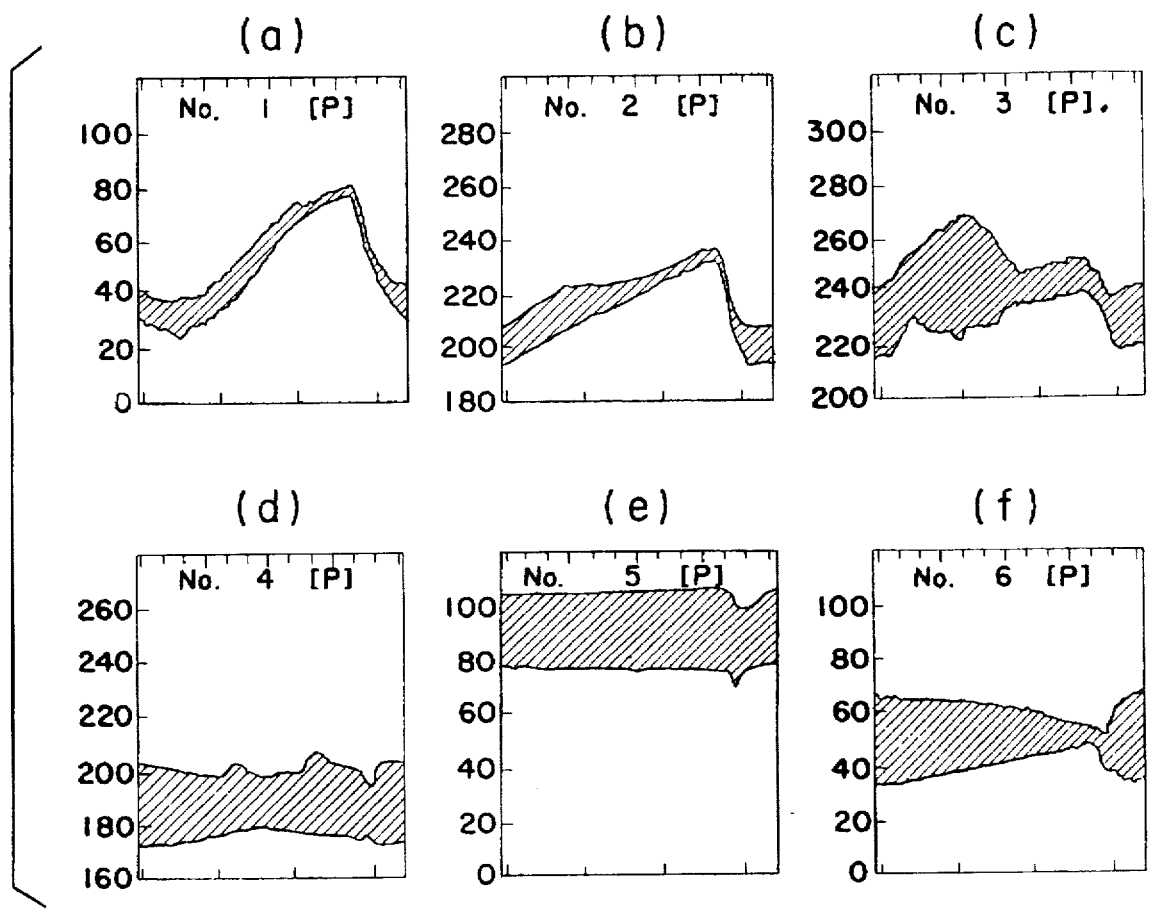
FIG. 3 is diagrams of (a) to (f) showing the fluctuation in pressure at points No. 1, No. 2 ... No. 6 of FIG. 2, respectively.
Figure 4:
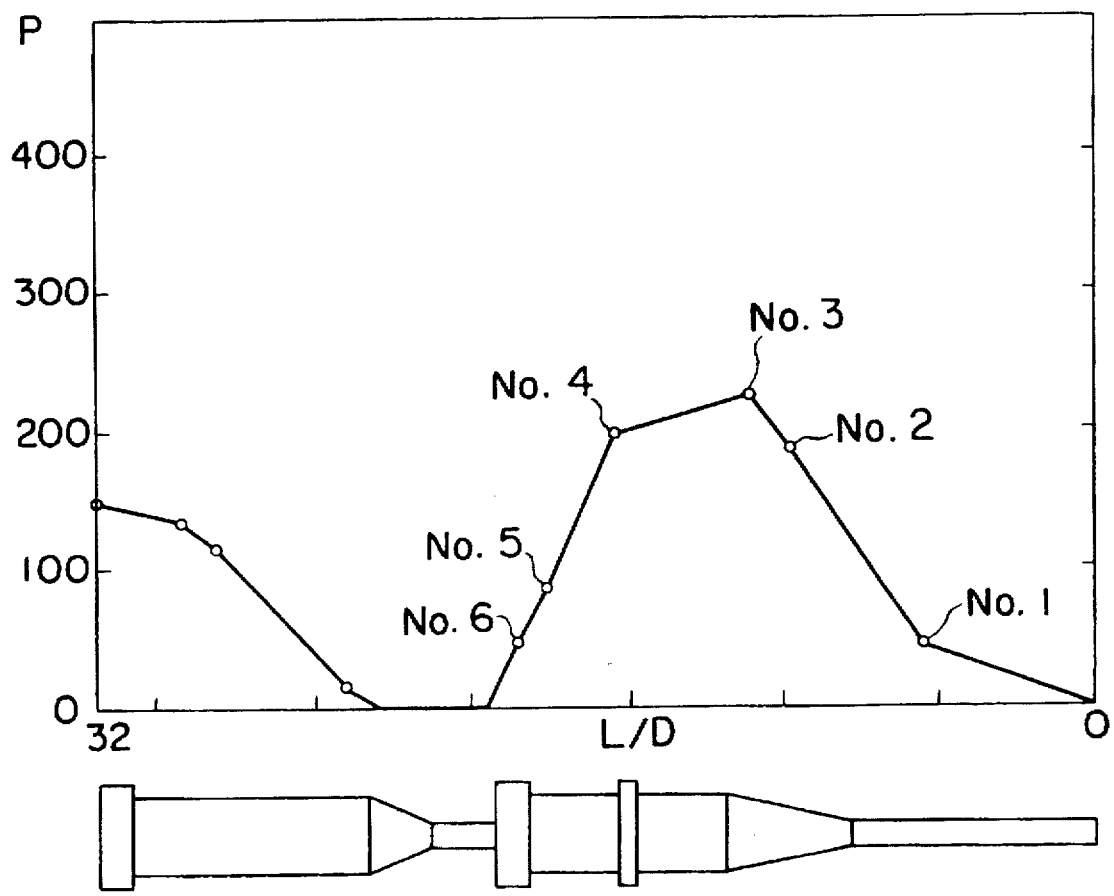
FIG. 4 is a diagram showing the detected values of pressure at each zone within the barrel in a screw according to the present invention.
Figure 5:
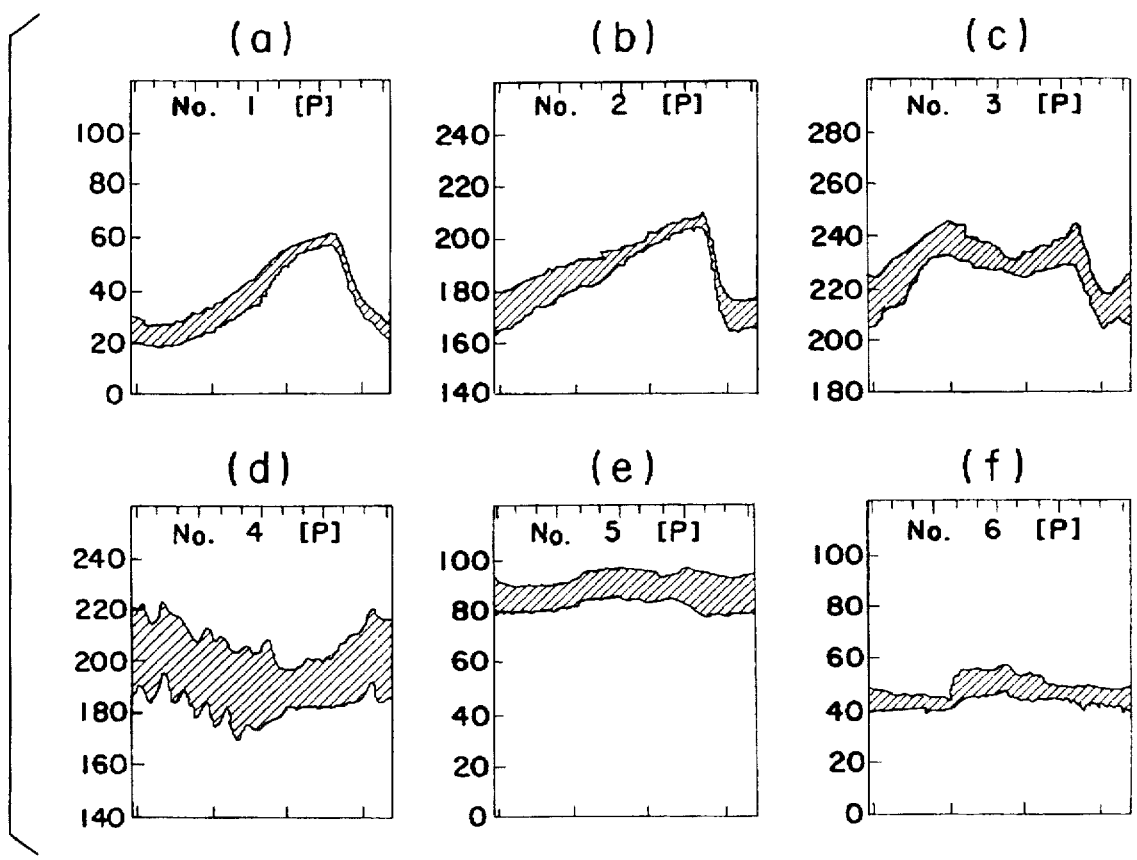
FIG. 5 is diagrams of (a) to (f) showing the fluctuation in pressure at points No. 1, No. 2 ... No. 6 of FIG. 4, respectively.
Figure 6:
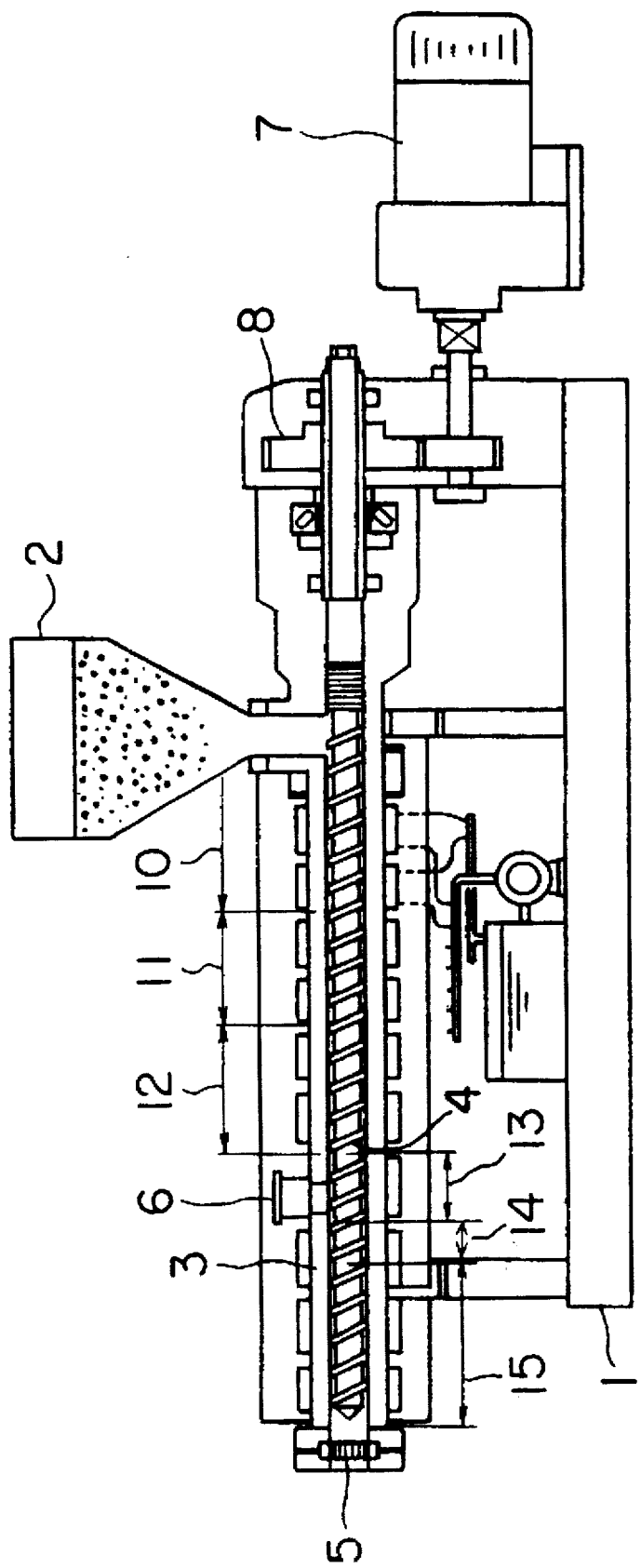
FIG. 6 is a view showing the construction of a general single screw extruder.

FIGS. 2 and 4 show the measurements of pressure at the parts corresponding to the various positions of the screw within the barrel of the conventional type and the present invention, respectively. In addition, (a), (b), (c), (d), (e) and (f) of FIGS. 3 and 5 show the waveforms of the fluctuation in pressure detected by pressure detectors at positions No. 1, No. 2 ... No. 6 in FIG. 2 and FIG. 4, respectively.

Hereupon, as shown in (c), (d), (e) and (f) of FIG. 3, it is clear that the conventional type is considerably irregular in the fluctuation in pressure at positions No. 3, No. 4, No. 5 and No. 6, which shows the occurrence of a considerable break-up phenomenon at each point.

In the meantime, as shown in (c), (e) and (f) of FIG. 5, it is clear that the present invention is small in the fluctuation in pressure at positions No. 3, No. 5 and No. 6, and the break-up phenomenon becomes small even at position No. 3. It is further clear that at positions No. 5 and No. 6 on the downstream side, the subdivision is performed in the intermediate mixing element, and the width of the fluctuation in pressure is small and regular, which shows good plasticization.

As a result, it is evident that the present invention offers great advantageous effects such as a reduction in fish eye, an increase of the quantity of extrusion by 26% and a decrease in the resin temperature at the outlet of the die by 5 degrees C.

Although in the above-described example, the Dulmage type screw is used for the forward end mixing element, any mixing elements such as a pin type, a diamond-cut type, a gear disk type, a polygonal multi-striped type or the like can be used, and can be made to the construction adapted to the resin depending on the selection thereof.

Moreover, the above-described example shows the construction of the vent-type screw, however, the invention can also be applied to the non-vent type screw. Further, the invention is not limited to the extruder, but can also be applied to a screw for an injection molding machine.

The construction of the subject matter according to the invention as described above allows the delayed beginning of the melting of resin having a low melting point, reduction in the occurrence of the wrapping phenomenon, easy subdivision in the intermediate mixing element, acceleration of the melting on the downstream side of the intermediate mixing element, and supply of the melted resin with a proper viscosity to the forward end mixing element, thereby enabling a rise in the resin temperature. Also, the present invention prevents a reduction in the delivery quantity, an increase in the capacity of the motor, and other such problems.

What is claimed is:

1. A screw for a molding machine, which comprises:

a feed section;

one or more compression sections; and one or more metering sections comprising an intermediate mixing element, a forward end mixing element disposed downstream of said intermediate mixing element at a distance therefrom, a deep flight channel screw section disposed upstream of said intermediate mixing element and having a channel depth, and a shallow flight channel screw section disposed between said intermediate mixing element and said forward end mixing element and having a channel depth shallower than said channel depth of said deep flight channel screw section;

wherein said intermediate mixing element has a cylindrical outer surface with a plurality of separate and independent grooves thereon, said grooves being configured such that said grooves are aligned at an angle with respect to an axis of rotation of the intermediate mixing element and said grooves are spaced apart from each other; and said forward end mixing element has a cylindrical outer surface with a plurality of separate and independent grooves thereon, said grooves being configured such that said grooves are aligned at an angle with respect to an axis of rotation of the forward end mixing element, and said grooves are arranged in an alternating manner so that one of two adjacent grooves extends towards a downstream end of said forward end mixing element along said angle, another of said two adjacent grooves extends towards an upstream end of said forward end mixing element along said angle, and portions of said two adjacent grooves are spaced apart from each other in an overlapping manner.

2. A screw for a molding machine according to claim 1, wherein said one or more metering sections comprises a first metering section and a second metering section disposed downstream of said first metering section at a distance therefrom, said first metering zone including said intermediate mixing element, said forward end mixing element, said deep channel flight screw section, and said shallow flight channel screw section.

* * * * *